United States Patent Office 2,831,862
Patented Apr. 22, 1958

2,831,862

ETHERS OF N-ALKYL-3-HYDROXYPIPERIDINE AND SALTS THEREOF

John H. Biel, Milwaukee, Wis., assignor to Lakeside Laboratories, Inc., a corporation of Wisconsin No Drawing. Application February 27, 1956
Serial No. 567,754

6 Claims. (Cl. 260—294.7)

This invention relates to chemical compounds. More particularly, this invention is concerned with the production of novel derivatives of piperidine.

This application is a continuation-in-part of copending application Serial No. 389,844, filed November 2, 1953, now abandoned.

According to the present invention there is provided a novel group of ethers of 3-hydroxypiperidine and N-substituted-3-hydroxypiperidines which have the formula

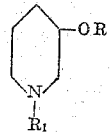

wherein R is an alkyl group of 1 through 10 carbons, an aryl group preferably which is monocyclic, an aralkyl group wherein the alkyl moiety is a lower alkyl and the aryl is preferably monocyclic, N-lower alkyl-3-piperidyl, 3-piperidyl, N-aralkyl-3-piperidyl wherein the alkyl moiety is a lower alkyl and the aryl moiety is monocyclic, N-acyl-3-piperidyl and 2,3-di-(N-alkyl-3-piperidyloxy) phenyl groups wherein the alkyl moiety is a lower alkyl, and $R_1$ is hydrogen and lower alkyl groups, and salts thereof.

The N-alkyl-3-piperidyl ethers may be conveniently produced by the following reactions:

(a) The condensation of the sodium or potassium salt of an N-alkyl-3-hydroxypiperidine with an appropriate alkyl or aralkyl halide;

(b) The reaction of an N-alkyl-3-hydroxypiperidine with an alkyl or aralkyl halide in the presence of a strong base such as triethylamine, sodium amide or lithium amide; or (c) The condensation of an appropriate sodium alcoholate with an N-alkyl-3-halopiperidine.

The described reactions are readily effected under liquid reaction conditions preferably comprising an inert organic solvent such as xylene, toluene and benzene. Elevated reaction temperatures, such as the reflux temperature, complete the reaction in about 1 to 12 hours. Following completion of the reaction, the desired N-alkyl-3-piperidyl ether may be recovered by conventional procedures.

Typical N-alkyl-3-hydroxypiperidines which may be used are those in which the alkyl group contains 1–8 carbons, such as methyl, ethyl, propyl and butyl as well as branched chain alkyl groups like isopropyl and t-butyl.

In place of the 3-hydroxypiperidines the corresponding 3-halopiperidines may be used having similar N-alkyl groups and preferably bromine or chlorine as the 3-halo substituent.

Alkyl halides which may be used as reactants are those of 1–10 carbons, straight or branched chained, as well as cyclic alkyls, and in which the halogen is bromine, chlorine or iodine. Aralkyl halides may be used in which the alkyl moiety is a lower alkyl of 1–8 carbons and the aryl group is monocyclic such as a phenyl or nuclear substituted phenyl group. To produce the aryl derivatives sodium or potassium salts of the corresponding hydroxy substituted aryls, such as phenol, may be employed. By reacting an N-alkyl-3-hydroxypiperidine with an N-alkyl-3-halopiperidine there is produced an N-alkyl-3-(N-alkyl-3-piperidyl) piperidyl ether; if the alkyl groups are the same, symmetrical di-n-alkyl-3-piperidyl ethers are formed.

Representative of the compounds which are provided by this invention are N-ethyl-3-piperidyl ethyl ether, N-propyl-3-piperidyl butyl ether, N-butyl-3-piperidyl hexyl ether, N-ethyl-3-piperidyl benzyl ether, N-methyl-3-piperidyl phenethyl ether, di-N-ethyl-3-piperidyl ether, di-N-pentyl-3-piperidyl ether and the like. The production of other such compounds is shown in the examples.

Production of similar ethers of 3-hydroxypiperidine which are unsubstituted at the cyclic nitrogen is achieved under similar conditions and with the same reactants with the exception that the cyclic nitrogen is protected with a group which may be cleaved subsequent to the reaction. Acyl groups derived from mono carboxylic acids such as formyl, acetyl, propionyl and benzoyl groups may be conveniently employed to protect the cyclic nitrogen. After the desired ethers are formed the protecting acyl groups may be removed by hydrolysis such as with alcoholic caustic, preferably at an elevated temperature such as at reflux. Recovery of the product is achieved by conventional procedures.

Typical compounds so produced are 3-piperidyl methyl ether, 3-piperidyl ethyl ether, 3-piperidyl hexyl ether, 3-piperidyl n-octyl ether, 3-piperidyl n-nonyl ether, 3-piperidyl benzyl ether, 3-piperidyl phenethyl ether, 3-piperidyl phenyl ether and di-3-piperidyl ether.

Acid addition salts of these and related compounds are formed by contacting the 3-piperidyl ethers with a mineral or organic acid such as hydrochloric acid, sulfuric acid, formic acid, acetic acid, citric acid, maleic acid, fumaric acid, phosphoric acid, tartaric acid, benzoic acid, cinnamic acid, succinic acid, mandelic acid and so forth.

Quaternary ammonium salts are formed by contacting alkyl, aralkyl, alkenyl, alkynyl and aralkenyl esters of mineral and organic acids with the N-substituted 3-piperidyl ethers, preferably in the presence of an organic solvent. Some compounds which may be reacted with the ethers to form quaternary ammonium salts are methyl bromide, methyl sulfate, benzyl chloride, propargyl bromide, methyl iodide and the like.

The compounds of this invention are useful antispasmodic compounds and function as ganglionic blocking agents. The salts are preferred for such uses since they are much more water soluble than the free bases. For such therapeutic uses non-toxic salts are employed.

Examples of the new compounds and their preparation are as follows:

EXAMPLE I

A. N-methyl-3-piperidyl ethyl ether, and its methobromide salt

To 5.75 g. (0.25 mole) of molten sodium metal in 150 cc. dry toluene was added 28 g. (0.24 mole) of N-methyl-3-hydroxypiperidine. The mixture was stirred and refluxed until most of the sodium had reacted. To the hot solution of the sodium salt was added 39 g. (0.25 mole) of ethyl iodide with stirring and refluxing. Stirring and refluxing were continued for eight hours. The reaction mixture was extracted with dilute aqueous hydrochloric acid, the aqueous acid extract saturated with potassium hydroxide, the alkaline mixture extracted with ether and the ether extract dried with potassium carbonate. The ether was removed by distillation and the product collected at 42–45° C. (4.5 mm.); yield 17 g. (50%).

*Analysis.*—Calcd. for $C_8H_{17}NO$: N, 9.78. Found: N, 9.86.

To 11.0 g. (0.077 mole) of the basic ether dissolved in 50 cc. of isopropyl alcohol was added 7.3 g. (0.077 mole) of methyl bromide. The product was precipitated by the addition of 10 cc. of anhydrous ether, collected by filtration and recrystallized from isopropyl alcohol; yield 7 g., M. P. 168–169° C.

*Analysis.*—Calcd. for $C_9H_{20}BrNO$: Br, 33.61; N, 5.88. Found: Br, 33.60; N, 5.86.

Other new compounds prepared by essentially the same method as set forth in Example I have the following structural formulae:

B. N-methyl-3-piperidyl 4'-phenylbutyl ether and its hydrobromide salt

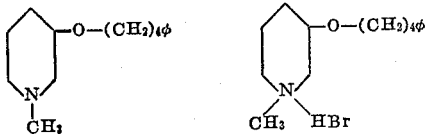

C. N-2'-phenylethyl-3-piperidyl methyl ether and its methobromide salt

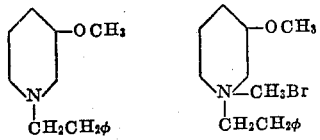

EXAMPLE II

N-methyl-3-piperidyl phenyl ether and its methobromide salt

To 7.8 g. (0.20 mole) of sodium amide in 100 cc. of toluene was added with stirring 18.8 g. (0.20 mole) of phenol. The mixture was slowly heated 80° C., at which temperature a vigorous evolution of ammonia took place. After the reaction had subsided, the mixture was stirred and refluxed for three hours. The solution was cooled to room temperature and 26.7 g. (0.20 mole) of N-methyl-3-chloropiperidine in 50 cc. of toluene added. The reaction mixture was stirred and refluxed for twenty-four hours, filtered hot and the filtrate extracted with dilute hydrochloric acid. The aqueous acid solution was saturated with potassium hydroxide and extracted with ether. The ethereal extract was dried with potassium carbonate and distilled. The product boiled at 48–49° C. (12 mm.); yield 32 g. (83%).

*Analysis.*—Calcd. for $C_{12}H_{18}NO$: N, 7.28. Found: N, 7.27.

To a solution of 9.6 g. (0.05 mole) of the basic ether in 50 cc. isopropyl alcohol was added 6.4 g. (0.067 mole) methyl bromide. The solution was seeded and crystallization allowed to proceed at room temperature. The crystalline product was collected by filtration and recrystallized twice from isopropyl alcohol; yield 2.5 g. (18%), M. P. 192–193° C.

*Analysis.*—Calcd. for $C_{13}H_{21}BrNO$: Br, 27.88; N, 4.88. Found: Br, 27.68; N, 4.95.

EXAMPLE III

1,2,3-tris-(N-ethyl-3-piperidyloxy)-benzene ether and its methobromide salt

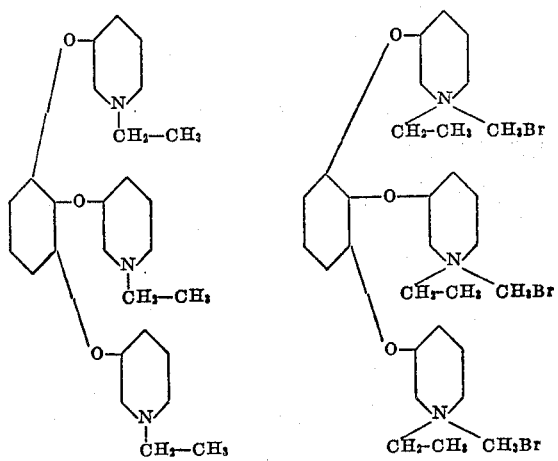

To 12.6 g. (0.10 mole) of pyrogallol in 250 cc. dry xylene was added 6.9 g. (0.30 mole) lithium amide. The mixture was stirred and heated at 135–140° C. for four hours. To the hot solution was added 44.1 g. (0.30 mole) of N-ethyl-3-chloropiperidine. The mixture was stirred and heated at 135–140° C. for six hours. Darco was then added, the mixture stirred and heated for another hour, cooled and clarified by filtration. The filtrate was extracted with dilute aqueous hydrochloric acid. The acid extract was made strongly alkaline with solid potassium hydroxide, the alkaline mixture extracted with ether and the ether extract dried with potassium carbonate. The ether was removed by distillation and the product collected at 208–210° C. (0.05 mm.); yield 16.5 g.

*Analysis.*—Calcd. for $C_{27}H_{45}N_3O_3$: N, 9.15. Found: N, 9.12.

To 2.3 g (0.005 mole) of base in 25 cc. anhydrous isopropyl alcohol was added 2.85 g. (0.030 mole) $CH_3Br$ and the mixture allowed to stand at 30° C. for four days. The solution was treated with Darco, boiled for a few minutes, filtered through Celite and anhydrous ether added to filtrate until precipitation of a gummy solid was complete. The ether was decanted, and the solid rubbed under fresh ether until crystalline, yield 2.4 g., M. P. indefinite, slow decomposition starting at 120° C.

*Analysis.*—Calcd. for $C_{30}H_{54}Br_3N_3O_3$: Br, 32.30; N, 5.66. Found: Br. 33.35; N, 5.00.

EXAMPLE IV

A. Di-N-methyl-3-piperidyl ether and its dimethobromide salt

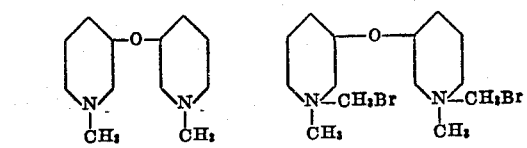

To 26.0 g. (0.23 mole) of N-methyl-3-hydroxypiperidine in 100 cc. dry toluene was added 8.9 g. (0.23 mole) of potassium metal. The mixture was stirred and refluxed for 3 hours and 30.0 g. (0.23 mole) of N-methyl-3-chloropiperidine added to the reaction mixture which was then allowed to stir and reflux for 26 hours. The inorganic precipitate was removed by filtration, the toluene filtrate extracted repeatedly with dilute aqueous hydrochloric acid, the acid extract washed with ether and saturated with solid potassium hydroxide. The alkaline mixture was repeatedly extracted with ether and the ether extracts dried with potassium carbonate. The ether was distilled and the residue fractionated in vacuo. The product was collected at 121–122° C. (9 mm.); yield 14 g. (29%).

Analysis.—Calcd. for $C_{12}H_{24}N_2O$: N, 13.21. Found: N, 13.12.

To 10.1 g. (0.048 mole) of the base in 100 cc. isopropyl alcohol was added 9.0 g. (0.096 mole) of methyl bromide. There was an immediate formation of a precipitate which was collected by filtration, yield 7 g. (37%); M. P. 246° C. dec.

Analysis.—Calcd. for $C_{14}H_{30}Br_2N_2O$: Br, 39.80; N, 6.97. Found: Br, 39.95; N, 6.99.

Other new compounds prepared by essentially the same method as set forth in Example IV are as follows:

B. Di-N-ethyl-3-piperidyl ether and its dihydrochloride salt.
C. Di-N-2'-phenethyl-3-piperidyl ether and its dihydrochloride and dimethobromide salts.

EXAMPLE V

N-methyl-3-piperidyl nonyl ether and its hydrochloride salt

In a 300 ml. 3-necked round bottom flask equipped with mechanical stirrer, reflux condenser with potassium hydroxide drying tube, thermometer, and mantle, place 23.0 g. (0.2 mole) N-methyl-3-hydroxypiperidine in 100 ml. anhydrous toluene. Add 7.8 g. (0.2 mole) potassium metal slowly with slow speed stirring at a temperature of 60–70° C. After ¾ of the potassium was added the material became gelatinous so 50 ml. toluene was added and the temperature raised to that of reflux. The remaining potassium was added and the solution stirred and refluxed for 3.5 hours. Then 41.4 g. (0.2 mole) n-nonyl bromide was added dropwise with stirring and the mixture stirred and refluxed overnight. The potassium bromide was filtered off and the filtrate extracted three times with 100 ml. portions of ethyl ether (discard) and then neutralized and made strongly alkaline with solid potassium hydroxide with cooling, then extracted three times with 100 ml. portions of ethyl ether, extracts combined and dried over anhydrous potassium carbonate and fractionally distilled. B. P.=117–124° (1.0 mm.); 25.9 g.; 53.8% yield.

Analysis.—Calcd. for $C_{15}H_{31}NO$: N, 5.81, Found: N, 5.95.

2.4 g. (0.01 mole) N-methyl-3-piperidyl nonyl ether was dissolved in 20 ml. anhydrous ethyl ether and acidified with ethereal hydrochloric acid. The white precipitate was collected by anhydrous filtration and dried. M. P. 83–86°; 1.7 g.; 63% yield.

Analysis.—Calcd. for $C_{15}H_{32}ClNO$: Cl, 12.81; N, 5.05. Found: Cl, 13.03; N, 5.10.

EXAMPLE VI

N-ethyl-3-piperidyl nonyl ether and its hydrochloride salt

In a 500 ml. three-necked round-bottom flask equipped with mechanical stirrer, reflux condenser with potassium hydroxide drying tube, thermometer and mantle, place 25.7 g. (0.2 mole) N-ethyl-3-hydroxypiperidine in 200 ml. anhydrous toluene. Add 7.8 g. (0.2 mole) potassium metal slowly with slow speed stirring, then stir at reflux temperature for three hours. Then 41.4 g. (0.2 mole) n-nonyl bromide was added dropwise with stirring and the mixture stirred and refluxed twenty-four hours. The potassium bromide was filtered off and the filtrate extracted three times with 100 ml. portions of ethyl ether (discard) and then neutralized and made strongly alkaline with solid potassium hydroxide with cooling, then extracted three times with 100 ml. portions of ethyl ether, extracts combined and dried over anhydrous potassium carbonate and fractionally distilled. B. P.=100–106° (less than 0.5 mm.); 23.3 g.; 45.6% yield.

Analysis.—Calcd. for $C_{16}H_{33}NO$: N, 5.49. Found: N, 5.59.

2.55 g. (0.01 mole) N-methyl-3-piperidyl nonyl ether was dissolved in 100 ml. anhydrous ethyl ether and acidified to pH 3 with ethereal hydrochloric acid. The white precipitate was collected by anhydrous filtration and dried. M. P. 113–115° C.

Analysis.—Calcd. for $C_{16}H_{34}ClNO$: Cl, 12.19; N, 4.80. Found: Cl, 12.23; N, 4.95.

EXAMPLE VII

3-piperidyl nonyl ether

A mixture containing 0.15 mole of N-acetyl-3-hydroxypiperidine, 0.15 mole of sodium metal and 200 ml. of dry toluene is refluxed for two hours. To this mixture is then added 0.15 mole of n-nonyl bromide and refluxing continued for ten hours. The reaction mixture is clarified by filtration and the filtrate subjected to distillation in vacuo. To the distillate is added 100 ml. of 20% methanolic potassium hydroxide in 100 ml. of ethanol and the mixture refluxed for 3 hours. After filtration the filtrate is concentrated to dryness, the residue suspended in water, extracted with ether, the ether extract dried with $K_2CO_3$ and then subjected to fractional distillation in vacuo to recover 3-piperidyl n-nonyl ether.

In place of n-nonyl bromide there may be used N-acetyl-3-chloropiperidine to form di-N-acetyl-3-piperidyl ether which may be hydrolyzed to di-3-piperidyl ether.

The foregoing description is given for clearness of understanding only and no unnecessary limitations are to be understood therefrom, for some modifications will be obvious to those skilled in the art.

What is claimed is:

1. A member of the group consisting of compounds having the formula

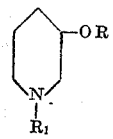

wherein R is a member of the group consisting of alkyl groups of 1 through 10 carbons, phenyl, phenyl-lower alkyl groups, N-lower alkyl-3-piperidyl, 3-piperidyl, N-acyl-3-piperidyl wherein the acyl group is derived from a lower carboxylic acid, 2,3-di-(N-alkyl-3-piperidyloxy) phenyl groups wherein the alkyl moiety is a lower alkyl, and $R_1$ is a member of the group consisting of hydrogen, lower alkyl groups, and acyl groups derived from lower carboxylic acids, and acid addition and quaternary ammonium salts thereof.

2. N-methyl-3-piperidyl phenyl ether.
3. 1,2(3-tris-(N-ethyl-3-piperidyloxy)-benzene ether.
4. Di-N-methyl-3-piperidyl ether.
5. N-methyl-3-piperidyl nonyl ether.
6. Di-3-piperidyl ether.

References Cited in the file of this patent

UNITED STATES PATENTS 2,479,843    Knox                Aug. 23, 1949

OTHER REFERENCES

Paul et al.: Bull. Soc. Chim., France, for 1947, pp. 341–345.

U. S. DEPARTMENT OF COMMERCE
PATENT OFFICE

CERTIFICATE OF CORRECTION

Patent No. 2,831,862     John H. Biel     April 22, 1958

It is hereby certified that error appears in the printed specification of the above numbered patent requiring correction and that the said Letters Patent should read as corrected below.

Column 6, line 59, for "1,2(3-tris-" read -- 1,2,3-tris- --.

Signed and sealed this 10th day of June 1958.

(SEAL)
Attest:
KARL H. AXLINE
Attesting Officer

ROBERT C. WATSON
Commissioner of Patents